Figure 1A:
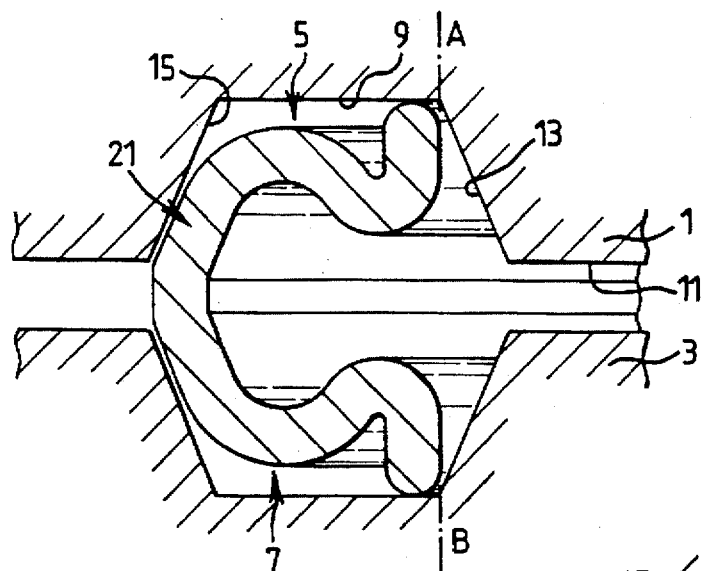

United States Patent [19]
Nicholson

[11] Patent Number: 5,669,612
[45] Date of Patent: Sep. 23, 1997

[54] METALLIC SEAL RINGS

[75] Inventor: Terence Peter Nicholson, Hexham, England

[73] Assignee: Specialist Sealing Limited, Channel Islands

[21] Appl. No.: 726,624

[22] Filed: Oct. 7, 1996

Related U.S. Application Data

[63] Continuation of Ser. No. 458,794, Jun. 2, 1995, abandoned.

[30] Foreign Application Priority Data

Jul. 13, 1994 [GB] United Kingdom .................. 9414113

[51] Int. Cl.$^6$ .................................................. F16J 15/08
[52] U.S. Cl. .................. 277/167.5; 277/205; 277/236; 285/336; 285/917
[58] Field of Search .................. 277/167.5, 205, 277/206 R, 236; 285/336, 917

[56] References Cited

U.S. PATENT DOCUMENTS

| | | | |
|---|---|---|---|
| 2,969,998 | 1/1961 | Rodaway | 277/206 R |
| 3,285,615 | 11/1966 | Trobvich | 277/206 R |
| 3,713,660 | 1/1973 | Luthe | 277/206 R |
| 3,758,123 | 9/1973 | Ksieski | 277/206 R |
| 4,214,763 | 7/1980 | Latham | 277/236 |
| 4,319,758 | 3/1982 | Nicholson | 277/236 |
| 4,408,771 | 10/1983 | Shelton | 277/236 |
| 5,240,263 | 8/1993 | Nicholson . | |
| 5,354,072 | 10/1994 | Nicholson | 277/236 |
| 5,426,236 | 6/1995 | Szarka et al. | 277/236 |

FOREIGN PATENT DOCUMENTS

| | | | |
|---|---|---|---|
| 1424864 | 3/1966 | France | 277/206 R |
| 777296 | 11/1980 | U.S.S.R. | 277/236 |
| 2038961 | 7/1980 | United Kingdom | 277/236 |
| 2239496 | 7/1991 | United Kingdom | 277/206 R |

OTHER PUBLICATIONS

"Metal V–Seals, Mark II"; Parker Seal Co. Mar. 1969.

*Primary Examiner*—Scott Cummings
*Attorney, Agent, or Firm*—Ohlandt, Greeley, Ruggiero & Perle

[57] ABSTRACT

An API groove seal is a metal ring of cross-section like a capital letter omega arranged so that the tips of its limbs provide the sole contact with the groove base before and after compression. The central or heel region may abut on the outer side wall of the groove. A family of seals for different pressure ratings has a common profile, differing only in respect of the thickness of the limbs.

9 Claims, 2 Drawing Sheets

METALLIC SEAL RINGS

This is a continuation of application Ser. No. 08/458,794, filed Jun. 2, 1995 (now abandoned).

This invention relates to metallic sealing the joints between opposed parallel surfaces such as for instance, and in particular, the end flanges by which pipe lengths are connected together by means such as studs, bolts and nuts, and to the manufacture of such rings.

The invention relates particularly, but not exclusively, to sealing rings capable of providing an improved alternative to the use of metallic sealing rings, i.e. gaskets, which are of solid multi-sided-radial cross-section such as the BX seal currently specified by the American Petroleum Institute (API) specified by the American Petroleum Institute (API) for sealing pipeline flange joints by location in opposed grooves in the flange faces. The standard API groove cross-section is a symmetrical trapezium, receiving an octagonal sealing ring.

In such applications leakage problems arise from time to time and particularly in the conveyance of gases at high pressure. In the main this is not primarily due to faulty design of the sealing rings but to the difficulty of ensuring that machining of the joint components is of a sufficiently high standard regardless of where they have been manufactured.

Problems arise from the fact that, whereas the flanges vary in dimensions, and in the size and number of the fixing bolts, according to the pressure rating, the cross-section of the BX ring joint is constant for all sizes and pressures. Significant manufacturing tolerances exist as to the dimensions of the grooves and the sealing ring, and as to the angles between the sides of the cross-sections of the groove and of the ring. In practice it can be difficult to achieve parallelism of the flanges and evenly distributed clamping loads around the joint.

The leakage problem is particularly acute when the flanges are intended to be drawn into face to face abutment instead of slight spacing or stand-off. There are many situations where it is essential to have face to face assemblies.

The seals disclosed in my British patent 2221000, U.S. Pat. No. 5,240,263, are self-energising seals capable of being used as direct replacements for the API seals in RX grooves, and capable of accommodating groove tolerances and non-parallel flanges. However these seals are relatively light-weight components made of sheet metal, typically 0.04 inches (1.0 mm) thick, and the seal dimensions are not intended to change significantly to accommodate different pressure ratings.

There is a need for a seal to be used for sealing grooved flanges and analogous components, and in particular for use as a direct replacement of the solid-section API BX seals, satisfying the following criteria:

The seal should be rugged, provide a high unit (sealing) loading and a high recovery factor (for satisfactory operation in extreme thermal gradients), it should accommodate wide tolerances and lack of parallelism in the components being sealed while avoiding sliding contact and local stress concentrations, and the seal design should be adaptable to suit all pressure ratings.

According to one aspect of the present invention, a groove seal has a cross-section in the form of a capital letter omega, that is to say the seal cross-section consists of a part-circular or otherwise smoothly curved C-shaped body portion, and at each end of this a respective substantially straight outwardly turned end part. The tips of the end parts provide the maximum thickness of the seal (greater than that of the C-shaped portion).

The shape and dimensions of the seal are such that the sealing contact exists at the tips of the end portions, and optionally at or near the mid-region of the C-shaped body, and not elsewhere.

In a particularly preferred arrangement, the central region or heel of the C-shaped body portion is thicker than the curved limbs of the body portion, the thicknesses of which are selected to match the pressure rating of the particular seal. For maximum rated pressure the limbs and central region may be of identical thickness.

According to another aspect of the present invention there is provided a groove seal having a cross-section in the form of a capital letter omega, in which the tips of the outwardly mined end parts provide the maximum axial thickness of the seal in the relaxed and compressed conditions, and the seal profile comprises curved limbs thinner than the outwardly turned end portions and thinner than the central region or heel of the seal profile.

According to a preferred aspect of the invention there is provided a family of seals of substantially common profile, having central regions of the same thickness and preferably, end regions of the same thickness, but with the curved limbs of different thicknesses corresponding to different pressure ratings.

The C-shaped profile ensures that the seal is fully self-energising.

Seals according to the present invention are preferably so designed that, for use in API standard seal grooves, the inside diameter of the seal ring is not less than, and preferably is substantially equal to, the inside diameter of the base surface of the trapezoidal seal groove.

This is in complete contrast to solid-section API seal rings, which are designed to seal against the two oblique side surfaces of the groove while avoiding contact with the groove base surface.

According to yet another aspect of the invention there is provided a sealed joint comprising two members disposed face to face and secured to one another, respective opposed grooves in the opposed surfaces of the said members, and a seal of omega-shaped cross-section in the grooves, having the tips of its outwardly turned end parts arranged to make contact with the respective base surfaces of the grooves and not with side surfaces of the grooves.

Seals of omega-shaped cross-section are already known, for example from GB 2038961 and U.S. Pat. No. 4,319,758. These are made of thin metal of constant thickness and are intended essentially as static seals between two parallel surfaces, not as groove seals.

Preferably, the tips are rounded or radiused, to provide a rolling action at these regions when the seal profile is compressed in use.

It is preferred that the tip radius is substantially greater than one half the thickness of the material forming the outwardly turned end parts, and the radius is centred at a position offset radially inwards from the centre lines of the outwardly end parts, so that the radiused tips are, in effect, tilted relative to the radial direction of the seal ring.

This provides a particularly good geometry of the seal ring in use.

These seals have been very successful in numerous static sealing applications, but are not always entirely successful in meeting the demands of sealing equipment and pipelines used in natural gas fields, where pressures are commonly in the region of 10000 PSI, and may exceed 30000 PSI.

A reason for the lack of success with the known omega-section seals when sealing extremely high pressures, is their lack of hoop strength. Because of this, the seat rings expand under the applied internal fluid pressure until they can expand no further because of the restriction imposed by the recesses in which the seals sit. During this change of diameter of the seal ring, the areas of the seal ring surface in contact with the mating faces to be sealed are subjected to a galling action which roughens the surfaces, and in most cases it becomes impossible to establish a satisfactory seal. If the thickness of the seal ring metal is increased, to increase the hoop strength, the flexibility of the seal is substantially reduced, as the seals are made of metal of constant thickness. This then requires larger bolts and increased torque to compress the seal, and makes the seal less able to cope with rotation of the flanges to be sealed, i.e. loss of parallelism, which can occur under the action of the pressure of a contained fluid.

These seals are particularly vulnerable to inward leakage, for example in circumstances which the internal pressure is pulsed, and in particular when the seal is used for sealing a pipeline connected to a reciprocatory pump with the pipeline under external pressure, or when used to seal a low pressure pipeline.

Seals according to GB 2038961 cannot be used as direct replacements for API-BX seals.

Another form of seal comprising a roughly omega-shaped profile is disclosed in GB 2239496 (U.S. Ser. No. 181964). This seal is intended for sealing between parallel surfaces and cannot be used to replace the BX seal. It is not readily adaptable to different pressure ratings so as to provide a family of seals, and it can give rise to sliding contact with a consequent risk of scuffing, galling or other damage on the surfaces to be sealed.

Figure 1B:
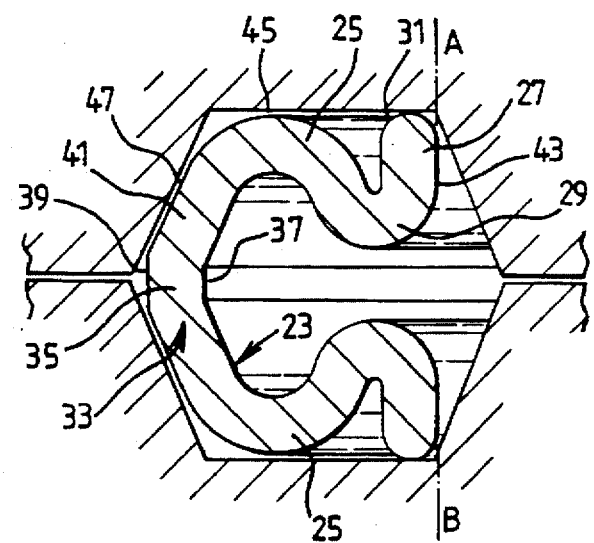
Figure 2:
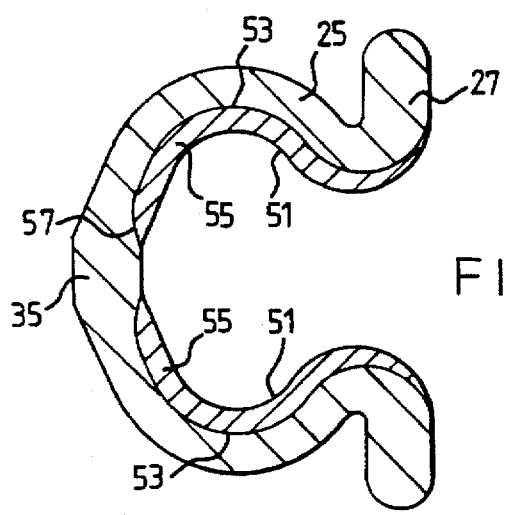
Figure 3:
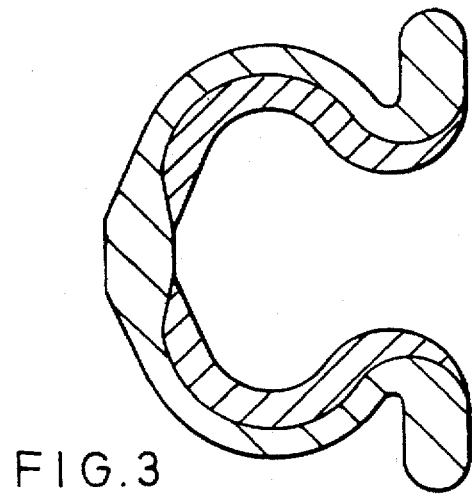
Figure 4:
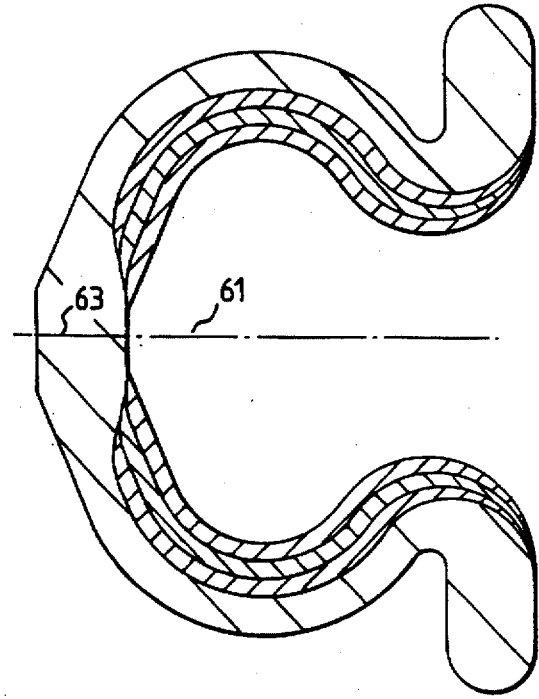
Figure 5:
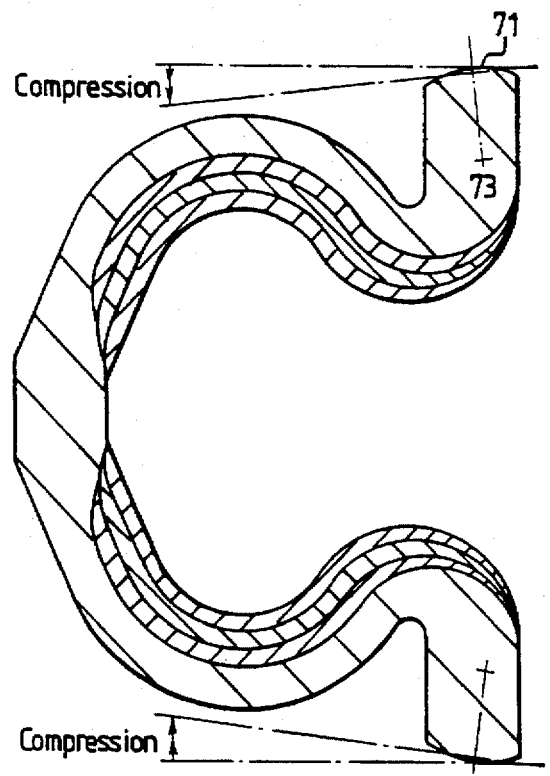
Figure 6:
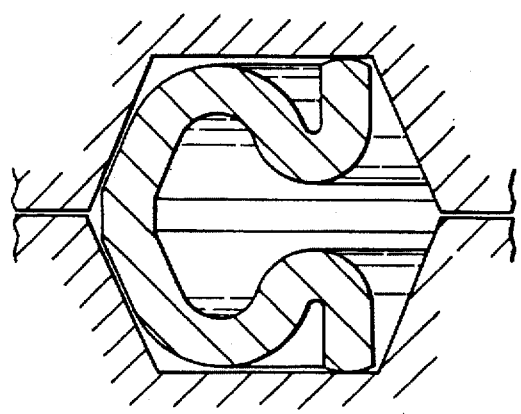

Seals embodying the present invention will be further described, by way of example only, with reference to the accompanying drawings, in which:

FIGS. 1a and 1b are radial cross-sections of a seal ring for the highest pressure ratings, FIG. 2 is a similar cross-section for a ring of lower pressure rating, FIG. 3 is a similar profile of a ring of still lower pressure rating, FIG. 4 shows how the profiles of a family of rings of different pressure ratings are related, FIG. 5 shows a modification of the ring profiles shown in FIG. 4, and FIG. 6 shows a ring corresponding to FIG. 5 when fully compressed.

FIGS. 1a and 1b show portions of upper and lower flanges 1, 3 to be sealed, for example pipe end flanges in an oil or natural gas pipeline. The flanges contain respective grooves 5, 7, which are directly opposite and form mirror images of one another. Each groove has a cross-section which is a symmetrical trapezium, comprising a plane base surface 9 parallel to the surface 11 of the flange, and two opposite oblique surfaces extending between the surfaces 9 and 11, namely a radially inner oblique surface 13 and a radially outer oblique surface 15.

The groove profile is the standard profile of the API-BX seal configuration, with a tolerance of +0.004 inch on groove width, 0.02 inch on groove depth, and ±¼° on side wall angle.

FIG. 1a shows the pipe joint assembled with a sheet metal seal ring 21 seated in the grooves, before the flanges are clamped together. FIG. 1b shows the same joint, after the flanges have been clamped together into direct face to face contact, corresponding to axial compression of the seal ring by 10 to 15%.

It will be understood that in other applications, a gap may be left deliberately between the flanges after clamping, for example as a result of a spacer ring placed between the flanges, to give a stand-off joint.

The seal ring is made of sheet metal. Its radial cross section is basically C-shaped, open on its radially inner side, that is to say, towards the pipeline bore so that the fluid being conveyed has access to the interior of the seal ring cross-section and will therefore tend to expand the seal ring under the internal pressure in use.

The seal ring illustrated in FIG. 1 is intended for use at very high rated pressures, for example 25,000 PSI, and is of substantially uniform thickness throughout its cross-section.

The cross-sectional profile comprises a C-shaped main body portion 23 with respective upper and lower limbs 25, of circular or other smoothly curved arcuate form.

Integral with the radially inner end of each limb is an axially outwardly extending lip or end region 27, joined to the main limb 25 by an integral circular arc forming a transition region 29. The radially inner and outer surfaces of the lip 27 are parallel to axis of the ring, and accordingly are cylindrical. Thus, the overall cross-section has the shape of a capital letter omega: Ω.

The arcuate limb regions 25 are not concentric, but have respective centres spaced apart in the axial direction of the ring, so that the axial separation of the regions 25 exceeds the diameter of the cross-sectional profile of either of the regions 25.

The end surface 31 of each lip region 27 is radiused, so that the surfaces 31 are convex.

The two part-circular limb regions 25 are interconnected by a heel region 33. This consists of a central region 35 defined by radially inner and outer surfaces 37, 39 which are parallel to the axis of the ring and are accordingly cylindrical. Rectlinear oblique regions 41 extend from the central region 35 to each of the arcuate regions 25 and blend smoothly into the latter.

Each oblique region 41 extends at an angle to the axial direction corresponding to that of the surfaces 15 of a seal groove, that is to say, 23° in the case of the API-BX seal.

To avoid problems caused by the machining tolerances of the sloping surfaces 13, 15 of the grooves, the inside diameter of the seal, i.e. of the cylindrical inner surfaces 43 of the tip regions, is made substantially equal to the internal diameter of the groove base surface 9, as indicated by the line A-B.

This measure, in combination with the radiused tips 31 of the lips of the seal ring, eliminates any mis-seating or other problems that might arise from the machining tolerances of the groove and any mismatch between these tolerances and those of the seal ring itself.

In particular, these measures ensure that the tip surfaces 31 at all times contact only the groove base surfaces 9.

This is in marked contrast to conventional solid API seals and to the seals disclosed in GB 2221000, U.S. Pat. No. 5,240,263. Conventional API seal rings are intended to make contact only with the sloping side surfaces of the grooves in which they are seated. The same is true of the seals disclosed in GB 2221000, U.S. Pat. No. 5,240,263, although some of the seals proposed therein may additionally make contact with the groove base surfaces. The present seals are designed to avoid contact with the inner oblique side surfaces 13 of the grooves.

The radiused surfaces 31 enable the seal ring to contact the surfaces 9 with a rolling action when the seal ring is compressed between the flanges, in order to accommodate misalignment or lack of parallelism of the flanges, particularly during compression.

An important feature is that the overall axial thickness of the seal ring is defined by the peaks of the surfaces 31, in both the relaxed condition shown in FIG. 1a and the compressed condition shown in FIG. 1b. The axial thickness measured over the arcuate limb regions 25 is always less than that measured over the radius tip surfaces 31. Therefore, there is always a clearance 45 between each limb region 25 and the adjacent groove base surface 9.

Under compression, as shown in FIG. 1b, the lip regions 27 are forced axially towards one another by the groove base surfaces 9, while remaining substantially parallel to the axis of the ring. The tip regions 27 should be sufficiently thick and stiff to maintain their axial orientation when the ring is axially compressed. As already mentioned, a slight rolling action may occur at the curved tip surfaces 31, particularly if the grooves 5, 7 are not perfectly aligned, or if the flanges are not perfectly parallel.

As a result, a high contact pressure is generated between the tip surfaces 31 and the groove base surfaces 9. This contact provides the desired sealing effect. The contact pressure is enhanced by the fact that the interior space of the ring profile, in use, contains the fluid under pressure which is contained within the sealed joint, and the fluid pressure acting on the inside of the seal ring profile tends to expand the latter and thereby force the tip surfaces 31 more firmly against the groove base surfaces 9.

The external surfaces 47 of the oblique regions 41 rest against the oblique outer surfaces 15 of the grooves. This surface contact locates the ring and supports it against the internal fluid pressure. Contact between the ring surfaces 47 and groove surfaces 15 may provide a secondary sealing action.

The described sealing ring operates essentially with a "circlip" action. That is to say, under compression the regions 25, 41 of the ring profile bend, progressively, such that the ring profile is reduced to a smaller diameter than in the relaxed condition.

The "circlip" action results in a high sealing contact pressure, giving high performance sealing at all pressures within the rating of the sealing ring, in conjunction with a high recovery factor enabling the seal to operate satisfactory in extreme thermal gradients. The "circlip" action avoids or reduces any tendency to hinge action in the seal profile with consequent local stress concentration and risk of fracture. The high unit sealing loading and high recovery factor enhance the seal loading and maintain reliable sealing under extreme conditions.

As already mentioned, the seal ring is fully self-energising from the contained fluid pressure; its heel region is fully supported by the outer walls of the grooves; and it can be used as a direct replacement or retrofit for the standard BX ring joints.

The seal, although extremely flexible, is also of such a rugged nature that it is strong enough to adjust to any out-of-alignment of the flange being sealed.

Misalignment and lack of parallelism of the flanges are readily accommodated by the seal ring and do not lead to sealing problems. The arcuate limb tips permit a rolling action, to accommodate misalignment and lack of parallelism, without introducing any sliding contact, so that there is no risk of scuffing or galling of the mating contact surfaces during compression.

As already described, the seal profile shown in FIG. 1 is intended for use at very high fluid pressures.

Based on the same external seal ring profile, the inventor has developed a range or family of seal rings, of different pressure ratings, which can be matched to the different pressure-rated flanges of the API-BX standards. This provides the significant advantage over existing groove-type seals, that the seal can be matched to the pressure ratings of the flanges or other members to be jointed.

This is achieved by reducing the thickness of the seal ring profile, but only in one or more of the regions 25, 29, 41, without changing any of the other dimensions of the profile. Preferably the thickness reduction is effected at the inside of the profile.

By way of example, FIGS. 2 and 3 illustrate seal ring profiles based on that shown in FIG. 1 but for rated pressures of 10,000 PSI and 5,000 PSI respectively. FIG. 4 shows how the internal profile of the seal ring is adjusted for different pressure ratings.

The radial thickness of the centre region 35 is maintained constant throughout the range of sealing rings. This ensures that the ring has adequate strength, and eliminates any risk that, under compression, the ring profile might hinge about or bend at the central region, thereby damaging the desired circlip action and leading to local stress concentration and risk of fracture. Maintaining the same basic thickness in the central region also maintains a high recovery factor for the ring profile under compression, thereby enhancing the sealing action.

The radial thickness of each lip region 27 is also maintained constant throughout the range of seal ring profiles. As already explained, these lip regions must remain substantially parallel to the ring axis at all times. Accordingly they must be sufficiently stiff, and therefore their thickness should not be significantly reduced in seal rings of lower pressure ratings.

In FIGS. 2 and 3, the internal profile corresponding to the highest rating ring, namely that of FIG. 1 is indicated by the reference numeral 51. The internal profile of the ring of reduced rating is indicated by the reference numeral 53. Accordingly, the rings of reduced pressure rating differ from the ring of FIG. 1 in that the thickness of material indicated by the hatched regions 55 on the inside is absent, either by machining the thicker profile or by initial forming of the ring profile.

In a preferred arrangement, the thicknesses of the regions 25 and 41 are both reduced by substantially equal amounts, and the thickness of the regions 29 is reduced progressively so as to blend the reduced-thickness arcuate limb regions 25 smoothly into the lip regions 27.

The transition between the reduced-thickness region 41 and the thicker central region 35 can be achieved in any convenient way. It is preferred that this transition is defined by a radially outwardly oblique transition surface 57, which is accordingly a frusto-conical surface sloping in the opposite direction to the frusto-conical external surface 47. The axially outer region of this surface 57 is blended smoothly by an arc into the internal surface of the region 41 or (in an extreme case) the region 25.

Preferably, the surface 57 extends at an angle of 12° to the axial direction of the ring.

The resulting reduction in thickness of the limb regions of the ring profile greatly enhances their flexibility and provides excellent adaptation to operation at lower rated fluid pressures.

Providing a transition surface 57 which slopes outwardly, away from the axis of the ring, enables the limb thickness to be reduced without in any way reducing the "circlip" type of action. On the contrary, reducing the limb thickness by means of an outwardly trending transition surface reduces thickness and increases flexibility while enhancing the circlip-type action, because the external diameter of the limbs remain unchanged while the limb thickness is reduced.

The resulting form of the transition from the thicker heel region to the thinner limb regions largely avoids any localised hinge action, or stress concentration where the reduced-thickness regions join the thicker heel. The heel remain effectively rigid while the limbs flex under compression.

By the selection of different limb thicknesses within a common external profile, we can generate a family of seal rings for different pressure ratings, as illustrated in FIG. 4 which shows four different seal ring profiles superimposed one on another. Selection of the internal surface profile of the seal ring can provide substantially infinitely variable adaptation, to suit all pressure ratings.

By way of example only, a high-nickel alloy sealing ring to replace BX 155 solid sealing rings is made from metal 0.100 inches thick, with a relaxed axial thickness of 0.755 inches. More generally, the axial thickness is 2xEx1.1+0.02/0.03 inch where E is the depth of a standard API BX groove. That is to say, in the depth dimension the ring is initially oversized by 11% relative to the groove depth. The radial thickness corresponds to the radial extent of the base and the outer sloping side of an API standard seal groove. For extreme pressures thickness might be increased, e.g. to 0.130 inch.

For a 20,000 PSI and over seal, the thickness remains constant at e.g. 0.120 inch throughout the seal profile. For lower pressures the thickness is reduced, to approximately 50% of the initial thickness or 0.060 inch in the arcuate limb regions, for a 5,000 PSI seal. Limb thicknesses are 0.080 inch for 10000 PSI, 0.100 inch for 15000 PSI seals In the rings shown in FIGS. 1 to 4, the tip radius is the "natural" radius based on the thickness of the material, that is to say, substantially equal to one half the thickness of the material so that the tip surface blends smoothly into the cylindrical inner and outer surfaces of the outwardly mined end regions of the ring profile.

FIGS. 5 and 6 show a modified tip shape. In this case the convex tip surface 71 has a radius substantially greater than the "natural" radius of the material thickness, so that the surface 71 is not blended smoothly into the cylindrical inner and outer surfaces of the outwardly mined end regions of the ring profile, but rather intersects these at an angle. Furthermore, the centre of curvature 73 of the surface 71, in the relaxed state of the ring shown in FIG. 5, is not placed symmetrically with respect to the thickness of the end regions, but rather is offset towards the central axis of the seal ring.

As a result the surface 71 is offset or tilted relative to the radial direction so that its inner extremity is higher than its outer extremity, with reference to the radial direction.

This configuration of the tip surface has been found to give improved adaptation to the behaviour of the seal profile in use. Specifically, it takes account a rolling action of the seal, in particular at the limb tips, during compression of the seal, and a possible slight flexing action of the seal profile which may occur when the seal is pressurised by the sealed fluid in operation.

FIG. 6 shows how the sealing ring of FIG. 5 would appear, after it has been fully compressed between the flanges to be sealed. It will be seen that in this condition of use, the convex tip surfaces 71 have moved to engage the groove base surfaces with the "tilt" of the surfaces 71 (visible in FIG. 5) substantially reduced.

The position of the centre of curvature 73 is selected to provide optimum accommodation of the movements of the seal profile when being compressed and when being pressurised in use.

Although reference has been made above to BX API grooves, seals embodying the invention can also be adapted for use in R and RX API grooves, or other seal grooves of different profile providing an analogous sealing action.

The described seal rings can be manufactured in a variety of ways.

A seal ring can be made of a single piece of metal. However, it is simpler and more convenient to produce the seal ring by first manufacturing two half rings of identical profile, and then joining these together on a medial plane 61 shown in FIG. 4, forming a seam 63.

The half-rings can be manufactured by machining from solid metal, by pressing or otherwise deforming sheet metal, or by a combination of deforming and machining operations. In the case of a sealing ring formed by joining two half-tings, the machining and/or deforming may be completed before the half-tings are joined together, or after.

In the case of seal rings with limbs of reduced thickness, as shown for example in FIG. 4, the thickness reduction will normally be effected by machining metal away from a profile initially of constant thickness. However, it is possible to provide the thickness reduction entirely or partly by forming of sheet metal or metal strip.

The half-rings can be joined by brazing, or welding. Welding can be effected by any convenient welding process.

For welding half-rings, electron beam welding is preferred owing to its lower heat input than processes such as TIG or plasma welding, making it possible to weld without difficulty thick ring cross-sections. It may be desirable to heat treat the seal after welding for example by re-solution heat treatment, before any subsequent age hardening treatment.

The seal ring is preferably heat-treated (in particular, if it has been made by welding or brazing half-rings) and may, if necessary or desirable, be subjected to an ageing process.

The ring material is selected to suit the desired application. In general, the sealing rings will usually be made of soft iron, carbon steel, stainless steel or a high nickel alloy. Inconel (trade mark) and Nimonic (trade mark) alloys are particularly suitable, especially for sour well applications, but may require an ageing treatment.

The seal ring may be subjected to a surface treatment, and/or may have a coating applied to it, to reduce surface friction and/or provide resistance to chemical attack and/or eliminate galling. Suitable coatings include silver, gold, copper, lead, PTFE.

By way example only, seal rings are made by welding together half-rings of Inconel; 718. The ring is vacuum age hardened to enhance its spring characteristics and corrosion resistance. A nickel coating for example 0.25 mm thick may then be applied for "sour well" use. The coated ring is then polished, vacuum heat-treated to anneal the nickel, and then re-polished. A low-friction coating may then be applied.

I claim:

1. A groove seal of metal which has a cross-section in the form of a capital letter omega having a smoothly curved C-shaped body portion comprising a central region and adjoining curved limbs each having a spring characteristic, and at each end of each said limb a respective substantially straight outwardly turned end part having a tip, wherein the tips of the end parts provide the maximum axial dimension of the seal, greater than that of the C-shaped portion, the shape and dimensions of the seal being such that in use sealing contact exists nowhere other than at the tips of the end portions and said central region of the C-shaped body; wherein said central region comprises a heel region disposed between first and second oblique regions, wherein said oblique regions are shaped to abut respective correspondingly shaped walls of a groove in which the seal is situated during use, thereby controlling the spring characteristics of said curved limbs.

2. The seal of claim 1 in which said seal has a pressure rating and said body portion has said central region thicker than the curved limbs of the body portion, the thicknesses of which limbs are selected to match the pressure rating of the particular seal.

3. The seal of claim 1 in which said oblique regions are at substantially 12° to the axial direction of said seal.

4. The seal of claim 1 in which the said limb tips are rounded to provide a rolling action at these regions when the seal profile is compressed in use.

5. The seal of claim 4 in which the limb radius tips have a curvature substantially greater than one half the thickness of the material forming the outwardly turned end parts, and said radius is centred at a position offset radially inwards from the centre lines of the outwardly mined end parts, so that the radiused tips are tilted relative to the radial direction of the seal ring.

6. A sealing assembly which comprises:

first and second oppositely disposed grooved flanges, wherein each said grooved flange has a grooved portion comprising a base surface disposed between oppositely disposed radially inner and radially outer oblique surfaces; and a groove seal, capable of being sealingly disposed within the respective grooved portions of said oppositely disposed grooved flanges, having a cross-section in the form of a capital letter omega which comprises:

(a) a C-shaped body portion comprising: a central region having a heel region disposed between first and second oblique regions; and first and second arcuate limb regions having spring characteristics and respectively disposed about the ends of said first and second oblique regions opposite said heel region; and (b) first and second substantially straight outwardly turned end parts each having a tip portion, wherein said end parts are disposed about the ends of said first and second arcuate limb regions opposite said first and second oblique regions and wherein said tip portions provide the maximum axial dimension of said groove seal, greater than that of said C-shaped body portion:

wherein the shape and dimensions of said groove seal are such that only said tip portions and said oblique regions come into contact with the surfaces of said grooved portion.

7. The sealing assembly according to claim 6 wherein said central region of said C-shaped body portion has a thicker cross-section than either said first or second arcuate limb regions, and wherein the thicknesses of which first and second arcuate limb regions are selected to match a desired pressure rating of said groove seal.

8. The sealing assembly according to claim 6 wherein said tip portions are rounded to provide a rolling action between said tip portions and the respective surfaces of said grooved portion.

9. The sealing assembly according to claim 6 wherein said first and second oblique regions have a rectilinear shape.

* * * * *